April 17, 1951

K. W. McLOAD 2,548,990

INVERTIBLE GEOPHONE

Filed Oct. 5, 1948

INVENTOR
KENNETH W. McLOAD
BY Sidney A. Johnson
ATTORNEY

April 17, 1951 K. W. McLOAD 2,548,990
INVERTIBLE GEOPHONE
Filed Oct. 5, 1948 3 Sheets-Sheet 2
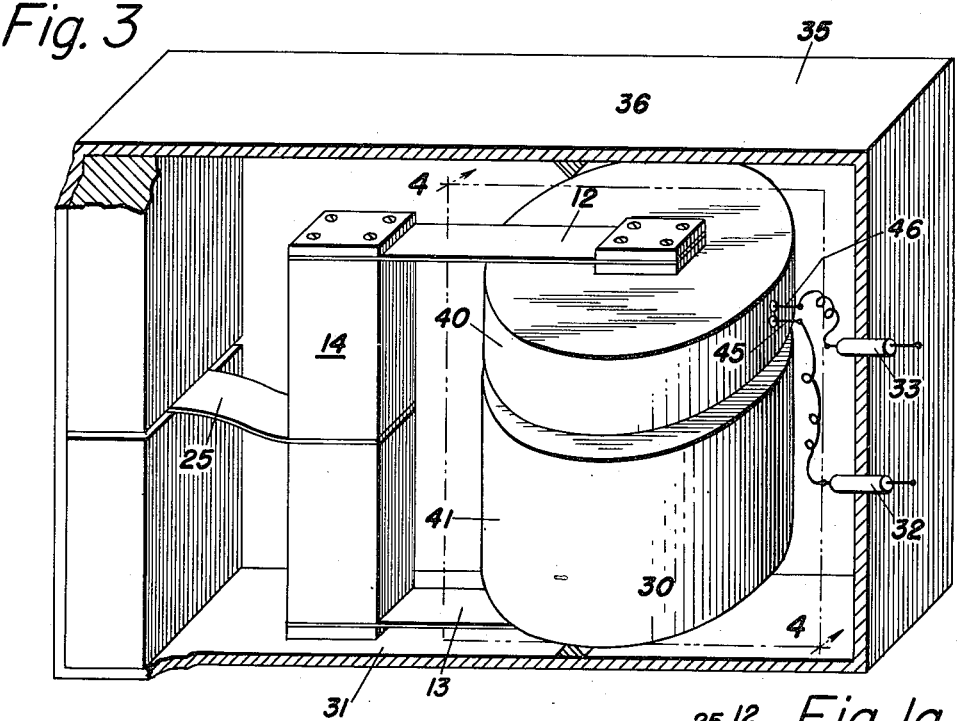
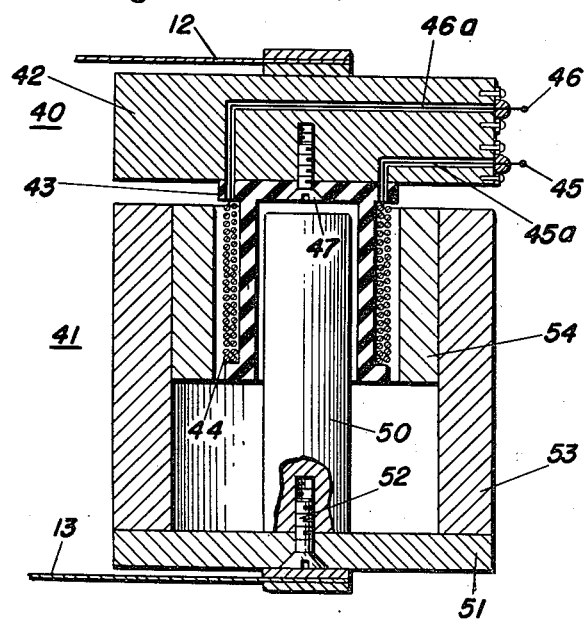
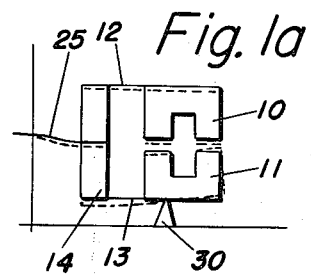
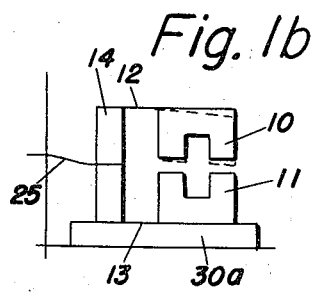
INVENTOR
KENNETH W. McLOAD
BY Sidney A. Johnson
ATTORNEY April 17, 1951 K. W. McLOAD 2,548,990
INVERTIBLE GEOPHONE
Filed Oct. 5, 1948 3 Sheets-Sheet 3

INVENTOR
KENNETH W. McLOAD
BY Sidney A. Johnson
ATTORNEY

Patented Apr. 17, 1951

2,548,990

UNITED STATES PATENT OFFICE 2,548,990

INVERTIBLE GEOPHONE

Kenneth W. McLoad, Dallas, Tex., assignor, by mesne assignments, to Socony-Vacuum Oil Company, Incorporated, New York, N. Y., a corporation of New York Application October 5, 1948, Serial No. 52,943

19 Claims. (Cl. 177—352)

This invention pertains to the art of seismic exploration and relates more specifically to improvements in vibration sensitive devices in which electrical impulses corresponding with artificially created seismic waves are generated.

In seismic prospecting it is customary to create seismic waves in the surface of the earth by detonating a charge of explosives. Waves thus generated emerge from the point of detonation and travel by various paths to detecting stations or geophone locations. The geophones generate electrical signals in sympathy with the seismic waves which, after amplification, are recorded generally by means of a recording galvanometer. The recording apparatus has associated therewith means for indicating the instant of detonation and a timing device for placing time markers on the record at regularly spaced intervals. With a knowledge of the total elapsed time between the instant of detonation and the arrival of waves at a detecting station, the depths of reflecting interfaces or refracting strata may be computed.

The geophones are usually located at regularly spaced points along a line and are necessarily oriented in such a position that the instantaneous voltage of a geophone will be of proper polarity with respect to the seismic waves to be recorded and of the same polarity as other geophones in a spread. Conventional geophones must be placed in the proper position and connected in proper sense with respect to polarity in order that a distinction may be made between upward and downward motions of the earth. Conventional detectors reverse their phase by 180 degrees if inverted from a normal position.

In carrying out the present invention there is provided a vibration sensitive device which may be operated in either of two positions. The voltage generated by the geophone for upward movement in either of its two operative positions will be of the same sense. Broadly, a preferred form of the invention is characterized by the provision of two vibrating systems with a coupling between the two systems for generation of a voltage upon variation in the relative positions thereof. The device is so constructed that one or the other of the vibrating systems is immobilized when in either of two operating positions. In one form the geophone comprises a pair of inertia elements resiliently mounted from an intermediate support. The intermediate support, in turn, is mounted movably with respect to a base or housing. By movably mounting the intermediate support, the vibrating systems comprising the inertia elements resiliently mounted from the intermediate support will, due to gravity, assume different fixed positions with respect to the housing in each of the two operative positions. When in either operative position one inertia element will be immobilized. A transducer coupled to inertia elements generates a voltage dependent upon the relative positions or the change in the relative positions of the inertia elements. For movement toward one another, voltage of one polarity is generated, and for movement away from one another, voltage of the opposite sign is generated. The phase of the voltage generated depends not upon the position the geophone occupies, but upon the direction of movement of one of the inertia elements with respect to the other.

For a more detailed explanation of the invention, reference may now be had to the following description taken with the accompanying drawings, in which:

Fig. 1 is a perspective view, partly in section, of one form of detector embodying the present invention;

Fig. 1a diagrammatically illustrates one mode of operation of the geophone of Fig. 1;

Fig. 3 is a perspective view, partly in section, of a further modification of a geophone embodying the present invention;

Fig. 4 is a cross-sectional view of the inertia elements of Fig. 3 taken on the plane 4—4 thereof;

Figure 1:
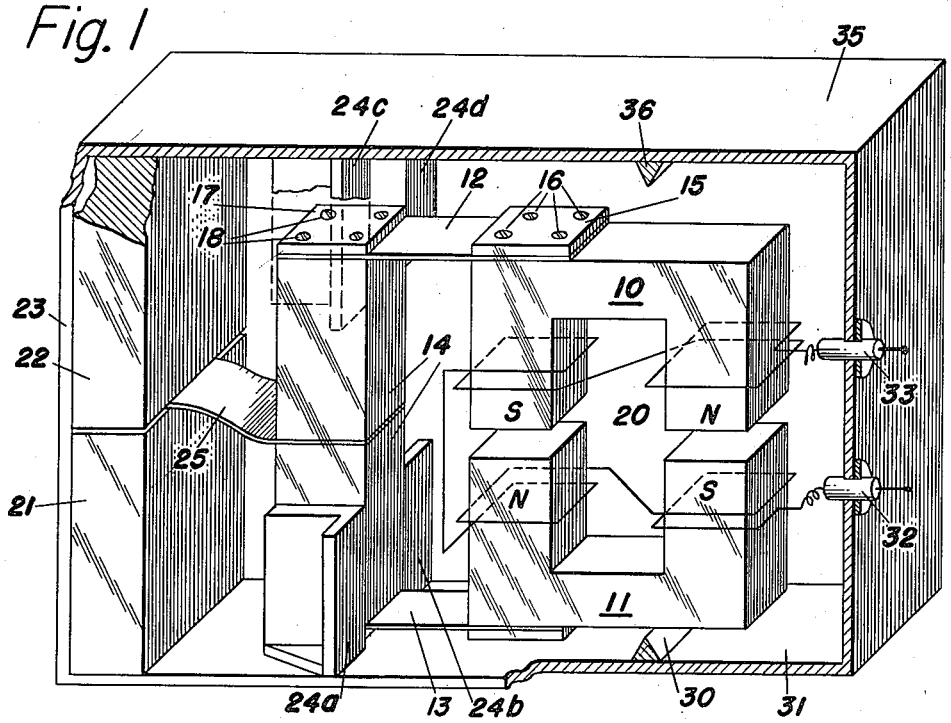
Fig. 1b illustrates a second mode of operation of the geophone of Fig. 1.

Referring now to Fig. 1, a geophone utilizing the invention has been illustrated having two vibrating systems comprising two permanent magnets 10 and 11, supported by leaf springs 12 and 13 from an intermediate supporting structure 14. The leaf spring 12 is rigidly fastened to the magnet structure 10 under the clamping plate 15 secured by screws 16. Similarly, the other end of the leaf spring 12 is secured to the upper end of the intermediate support 14 under the clamping plate 17 secured by screws 18. Leaf spring 13 likewise is secured at one end to magnet structure 11 and at the other end to the lower end of the intermediate support 14. The magnets 10 and 11 are secured in such a position that unlike poles are opposite and spaced from one another with confronting pole faces having an air gap therebetween which is varied by vibration of either or both of the magnets. The magnets 10 and 11 thus mounted, plus the air space between the pole faces, comprise a magnetic flux path or loop. Variations in the length of the air gap change the reluctance of the path. As a result the total flux traversing the magnetic flux path is varied. A suitable coil, diagrammatically illustrated by the series windings 20 carried by the magnets 10 and 11, links or encloses the flux path. Voltages generated in the windings 20 are proportional to the rate of change of the flux linking them. The coil as illustrated is so wound that voltages generated in the series windings on the four pole pieces are additive in polarity.

The intermediate support 14 is movably mounted as by leaf spring 25 from a primary support which may be a structure to be enclosed in a geophone housing. The supporting structure is generically represented by the elements 21 and 22 secured to the end 23 of the housing. One end of the leaf spring 25 is clamped in or secured to the intermediate support 14; the other end is rigidly secured to the frame as between mounting members 21 and 22. The leaf spring 25 in its unflexed position lies in a plane parallel to and intermediate the planes of leaf springs 12 and 13. The leaf spring 25 is of such resiliency that the intermediate support 14, carrying the magnetic structure including the magnets 10 and 11, for either of two positions allows one of the two magnets (10 or 11) to rest upon a support or fulcrum provided adjacent each magnet. More particularly, a fulcrum indicated by a knife-edge or wedge 30 fastened to the side 31 of the geophone housing will, for the position illustrated in Fig. 1, carry the weight of the magnet 11. In this position, that is, with the side 31 of the geophone resting upon the ground, seismic waves received will cause the magnet 11 to move toward or away from the magnet 10. The magnet 10 will remain substantially stationary with respect to a fixed point in space due to the inertia of the suspended mass. In this position an impulse from below causes a decrease in the length of the air gap and, consequently, lowers the reluctance of the flux path. Assuming that the voltage thus generated causes the terminal 33 to be positive with respect to terminal 32, movement of the magnet 11 away from magnet 10 will cause terminal 33 to be negative with respect to terminal 32.

If the geophone is placed with the side 35 on the earth, the intermediate support 14 carrying the magnets 10 and 11 will change position so that the magnet 10 will rest upon a fulcrum 36 fastened to the side 35 of the geophone housing. In this position an impulse from below causes the magnet 10 to approach the magnet 11, thus decreasing the length of the air gap. As in the other operative position, the terminal 33 will be positive with respect to the terminal 32 as magnet 10 approaches magnet 11. In either position the instantaneous polarity of the voltage generated with respect to an impinging seismic wave will have the same phase. Thus, there is provided a geophone which may be operated in either of two positions in which the voltage generated will be of the same instantaneous phase with respect to ground motion.

Detector units comprising the magnets 10 and 11 are generally known as variable reluctance detectors. It is apparent that other types of detectors may be utilized. However, regardless of the particular shape or design of detector unit used, it is necessary that the natural periods of the two suspensions or vibrating systems are the same. As is well recognized in the seismograph art, geophones having natural periods low with respect to the frequencies of the seismic waves to be detected are generally preferred. Accordingly, the length, width and stiffness of the springs 12 and 13 will for each design be chosen in accordance with well known principles of mechanics to effect suspensions having the desired frequency characteristics.

The leaf spring 25 of Fig. 1 is preferably of substantial width to prevent lateral movement or wobble of the suspended magnets 10 and 11. To stabilize the suspension, a slideway or channel may be provided in which the intermediate support 14 may travel. As shown in Fig. 1, guides 24a and 24b fastened to side 31 of the geophone housing, and guides 24c (partially broken away) and 24d fastened to the side 35, are so positioned that the support 14 may move freely along a line lengthwise thereof and is prevented from moving or vibrating laterally.

The geophone illustrated in Fig. 1 will operate in one of two modes depending on the location and type of the support upon which the lower magnet rests. In Fig. 1 and in the diagrammatic view of Fig. 1a where corresponding parts have been given the same reference characters, a knife-edged fulcrum 30 located at the center of percussion of the suspension, which in this case includes springs 13 and 25, serves to support the vibrating elements. An impulse from below will cause the magnet 10 and the intermediate member 14 supported by both springs 13 and 25 to move relative to the case. The maximum amplitude position of the geophone elements when subjected to an impulse from below is illustrated by the dotted lines in Fig. 1a.

A different mode of operation obtains if a support for the lower magnet illustrated in Fig. 1b is utilized. In this case, the support 30a, which in practice may be the bottom of the case, extends throughout the length of magnet 11, spring 13 and the intermediate support 14. The magnet 11 and the intermediate support 14 both are fixed with respect to the case with the magnet 10 being free to vibrate upon application of an impulse thereto. Thus, with the construction illustrated in Fig. 1a, the magnet 10 and the intermediate support 14 both vibrate, and the magnet 11 rotates slightly about the point of support. In Fig. 1b the intermediate support 14 and the magnet 11 are immobilized with only magnet 10 free to vibrate.

Figure 2:
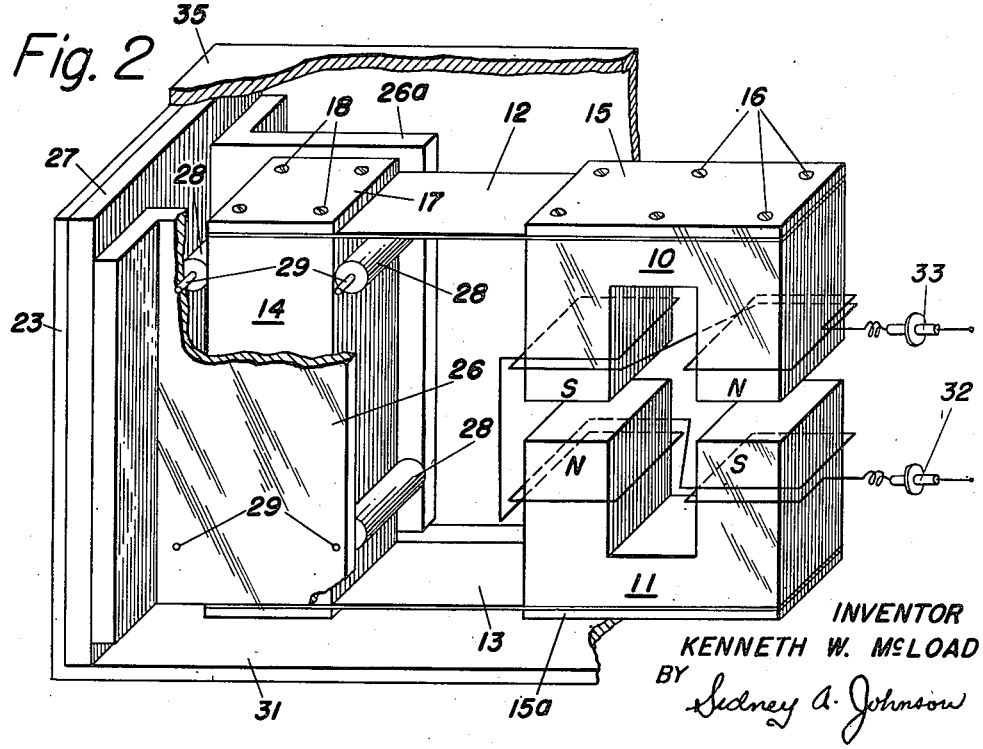
Fig. 2 is a perspective view, partly in section, of a modified form of the invention with certain parts omitted.

A system vibrating in the second mode utilizing a modified support for the member 14 has been illustrated in Fig 2. For convenience, parts corresponding to those of Fig. 1 have been given the same reference characters. The intermediate support 14 is mounted in a slideway which comprises members 26 and 26a secured to plate 27 which in turn is fastened to the end 23 of the geophone housing. Four rollers 28 (three of which are shown) complete the slideway for support 14. In the position illustrated, the intermediate support 14 and magnet 11 rest upon the bottom 31 of the geophone case. The magnet 10 is thus freely suspended, and magnet 11 is immobilized. As in Fig. 1, upward motion of the earth decreases the length of the air gap between the magnets 10 and 11. When the geophone is inverted, the intermediate support 14 may travel over rollers 28 to the second operative position. The support 14 and the magnet 10 will then rest upon the side 35. Upward movement of the earth, as in the other position, decreases the air gap length. The springs 12 and 13 extend the full width of their respective magnets and are secured under plates 15 and 15a. In this modification, the support 14 and the lower magnet rest upon the geophone housing. The rollers 28 allow the support 14 to travel freely from one operative position to the other. With the intermediate support 14 thus gravitationally positioned, the phase of the voltage generated with respect to ground motion is the same for either operating position.

Referring now to Figs. 3 and 4, a two-position, single-sense dynamic geophone is illustrated as comprising an inertia member 40 supported from the intermediate member 14 by leaf spring 12, and a second inertia member 41 supported from the other end of the intermediate member 14 by the leaf spring 13. In the detailed sectional view of Fig. 4 the inertia element 40 is illustrated as comprising a mass 42 of non-magnetic material to which there is attached a tubular form or spool 43 which carries a coil 44. The conductors 45a and 46a connect the coil 44 to terminals 45 and 46 which in turn are connected to the geophone terminals 32 and 33 as shown in Fig. 3. A screw 47 rigidly secures the coil form 43 to the mass 42. The inertia member 41 includes a cylindrical permanent magnet 50. The magnet 50 is fastened to a disc 51 of soft iron or other magnetic material as by a screw 52. A soft iron cylinder 53, closed at one end by and secured to disc 51, is of length equal to the length of the permanent magnet 50. A soft iron ring 54 is fastened to and concentrically with the cylinder 53 and forms a pole piece adjacent the magnet 50. A radial magnetic field exists in the air space between the upper end of magnet 50 and the pole piece 54. With the inertia structure 40 suspended in coaxial relationship with the inertia structure 41, movements therebetween will generate a voltage therein upon variations in the magnetic flux linking the coil 44. The instantaneous polarity of the voltage generated depends upon whether the structure 41 is moving toward or away from the structure 40 or, stated another way, whether the flux linking coil 44 is increasing or decreasing. By mounting the inertia structures 40 and 41 from the intermediate support 14 as by the springs 12 and 13, relative movement between the inertia members causes a voltage to be generated. As shown in Fig. 3, with the inertia member 41 immobilized, the inertia member 40 is the only one free to move with respect to the case or geophone housing. Consequently, upward movement of the earth will cause the element 41 to move toward the element 40. Similarly, when the geophone is inverted the inertia element 40 is immobilized, and the inertia element 41 is free to move with respect to the geophone case. As characteristic of the devices of Figs. 1 and 2, the polarity or phase of the voltage generated is independent of the geophone position.

In the structure of Fig. 3, as in all modifications of the present invention, the natural frequency of vibration of the two suspended masses should be the same. It is evident that dissymmetry of suspension or different natural frequencies of the suspended inertia elements would cause the geophone output in one operating position to differ from the output in the other operating position. However, by selecting materials so to produce elements 40 and 41 of Fig. 3 having the same mass, the geophone output will be the same for both operating positions not withstanding any dissymmetry in the configuration of elements 40 and 41.

It is to be noted that since mass 42 is nonmagnetic, there is no force of attraction between the two suspensions and, thus, no tendency to lock or freeze the detector as is characteristic of variable reluctance type detectors such as shown in Figs. 1 and 2. A further advantage of this form is that parts cylindrical in shape lend themselves generally to more economical construction.

Figure 5:
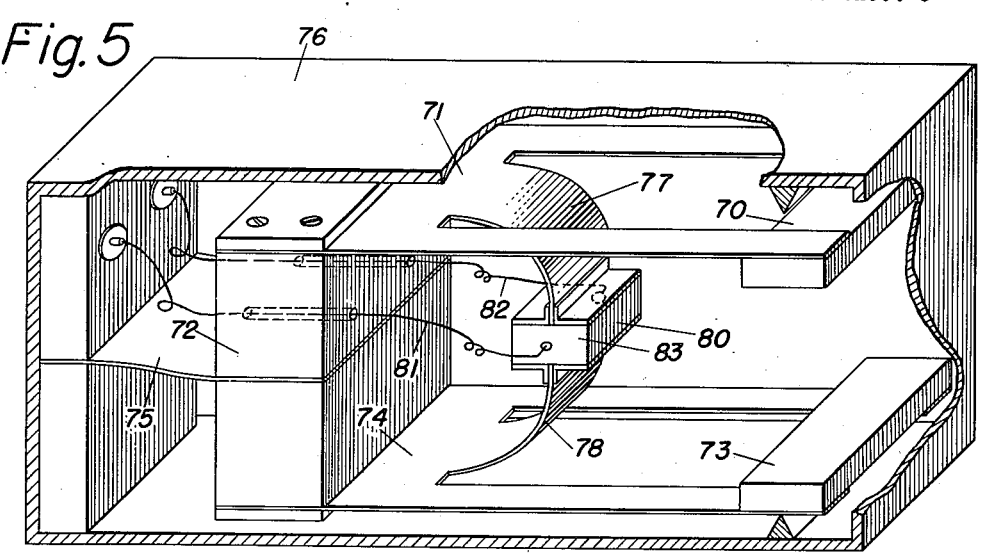
Fig. 5 is a perspective view, partly in section, which illustrates the invention utilizing piezoelectric crystal as the generating element.
Figure 6:
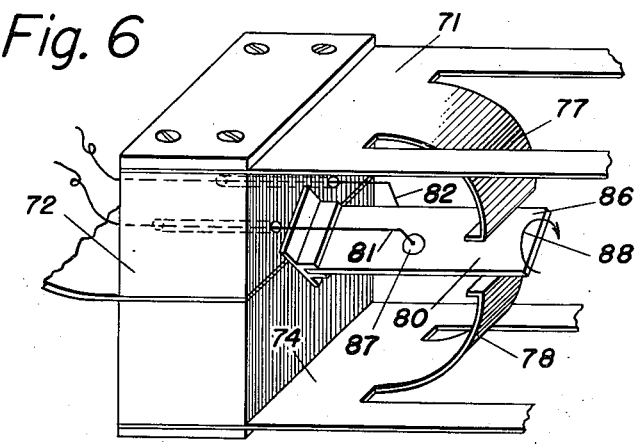
Fig. 6 is a modification of a portion of Fig. 5 utilizing an elongated piezoelectric block as the generating element.

The geophones illustrated in Figs. 1–4 utilize an electromagnetic coupling between the two vibrating systems to convert elastic waves or ground movements into electrical impulses. It will be recognized that the magnitude of the voltage generated is proportional to the velocity with which one element approaches or recedes from the other element. Geophones having an output proportional to displacement are illustrated in Figs. 5 and 6 where a mechanical coupling between the inertia elements is utilized. In the device of Fig. 5 mass 70 is suspended by a bifurcated leaf spring 71 from one end of an intermediate support 72. Similarly, a mass 73 is suspended from the other end of the intermediate support 72 by a bifurcated leaf spring 74. Leaf spring 75 resiliently supports the intermediate member 72 from the geophone housing or case. An intermediate portion of each of the bifurcated springs 71 and 74 forms the projecting tongues 77 and 78, between the extremities of which is mounted a block 80 of piezoelectric material. The piezoelectric material or crystal 80 is so oriented with respect to the retaining tongues 77 and 78 that pressure exerted thereupon due to vibration of, or relative movement between the masses 70 and 73 gives rise to a voltage between a pair of faces other than those upon which the tongues 77 and 78 exert pressure. As illustrated, conductor 81 makes contact with the end 83 of the crystal 80; conductor 82 is electrically connected to the opposite end of the crystal 80. The masses 70 and 73, the intermediate supporting structure 72 and spring mountings 71 and 74 are in a manner characteristic of the present invention movably mounted as by spring 75 so that for either of the two operating positions of the geophone only one of the two masses is free to vibrate, and the other is immobilized, resting upon its associated fulcrum or upon the case itself.

A decrease in the distance between masses 70 and 73 causes the pressure exerted by tongues 77 and 78 to increase, thus increasing the crystal output. The pressure exerted, thus the voltage generated, is proportional to the amplitude of ground movement. In Fig. 6, where elements corresponding to those in Fig. 5 have been given the same reference characters, the quartz or other piezoelectric element 80, instead of being a block as in Fig. 5, is an elongated element or slab which is fastened at one end to and insulated from the intermediate support 72 in such a position that the end 86 extends obliquely between the tongue ends 77 and 78 of the bifurcated springs 71 and 74. Vibration of, or relative movement between, the masses 70 and 73 causes the crystal or piezoelectric slab 80 to be twisted. Stated otherwise, pressure exerted by the tongues 77 and 78 upon relative motion between the inertia masses distorts the crystal slab 80 from its normal planar configuration. Conductor 81 connected to contact 87, and conductor 82 connected to a contact similar to contact 87 and positioned on the crystal face opposite thereto, detect the voltage generated due to the mechanical deformation of the crystal slab 80. It is obvious that no matter which of the two springs 71 and 74 of the geophone is uppermost, upward motion of the earth causes an increase in the torque as indicated by arrow 88.

Figure 7:
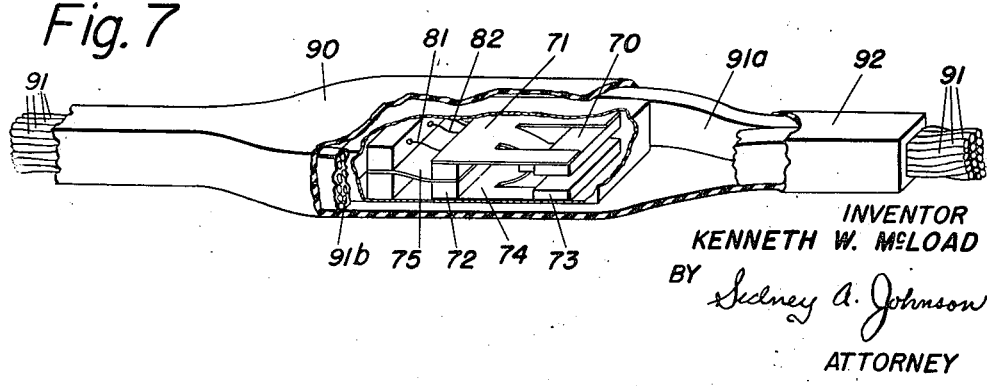
Fig. 7 is a perspective view, partly in section, of a length of cable which includes a geophone.

Geophones embodying the invention may be utilized in regular seismograph exploration in the place of prior art geophones, eliminating the necessity of positioning each geophone in a spread in like operating positions. Geophones constructed in accordance with the foregoing description are particularly suitable for the construction of, and use in, a prefabricated exploration cable. A section of such a cable is illustrated in Fig. 7. A modification of the construction of Fig. 5 has been illustrated though any of the other forms may be used.

The geophone comprising two vibratory systems mounted in its housing is molded in a fabric reinforced rubber sheath 90. The geophone housing and the sheath 90 have been partially broken away to illustrate the orientation of the geophone. The lower vibrating system comprising the spring 74 and the inertia element 73 attached to the lower end of the intermediate support 72 rests upon the bottom or the lower side of the geophone case. The upper vibrating system including spring 71 and the inertia element 70 is freely suspended. The action of the spring 75 mounting the intermediate support causes one of the two vibrating systems to be immobilized.

The geophone is enclosed in the cable in a section where the rubber sheath 90 has one cross-sectional dimension enlarged. The other cross-sectional dimension remains substantially constant throughout the length of the cable. The rubber sheath also encloses a plurality of pairs of electrical conductors 91. Geophone conductors 81 and 82 are connected to a selected pair of the conductors 91. A complete exploration unit or cable includes a plurality of such geophones so enclosed at predetermined points along the length thereof. Each pair of the conductors 91 is connected to one geophone included in the cable, or, if desired, one or more geophones may be connected to each pair of conductors. The geophone housing is rectangular in cross-section with its elongated sides parallel to the planes of the springs 71, 74 and 75. By providing a narrow, flat housing, each geophone automatically will position itself on a flat side.

As illustrated in Fig. 7 the conductors 91 enclosed in a portion 92 of the sheath 90 are preferably divided and are positioned on both sides of the cable geophone. Half of the conductors, 91a, are bundled together and pass along one side of the geophone, and the other half, conductors 91b, pass along the other side of the geophone.

The cable is a unitary structure with slightly enlarged portions at each geophone location or position. It may be wound upon a reel and otherwise manipulated as any other rubber insulated cable. The cable is merely unreeled from a truck or other vehicle while traveling the length of a spread to position it to receive seismic waves. The cable in portions intermediate the geophones may be either square, rectangular, or round. However, at the geophone location it is rectangular, having the sides parallel to the suspension springs 71, 74 and 75 elongated and the other two sides relatively narrow. Geophones encased in such portions of the cable automatically will be oriented in one of two operating positions as the cable is unreeled. No further adjustments or preparations need be made before taking a seismic record.

The particular embodiments of the invention described may be taken as illustrative. The dimensions and the relative proportions of the inertia elements, the springs, and the intermediate supports may be varied or modified to satisfy particular requirements as long as two vibrating systems having the same natural period are supported in such a manner that one of those vibrating systems will be immobolized when in either of two operating positions. The generating element, responsive to the spacing or change in spacing between the inertia elements, produces a voltage proportional to displacement or velocity of the earth. It is to be understood that displacement detectors of the strain-gauge type may be utilized in place of the piezoelectric elements of Figs. 5 and 6 which will cause a change in circuit resistance proportional to displacement.

Though several modifications of the invention have been illustrated and described, it is to be understood that further modifications may now suggest themselves to those skilled in the art all within the scope of the appended claims.

What is claimed is:

1. A vibration sensitive device which comprises two vibrating systems, means coupling said vibrating systems for generation of a voltage upon variations in the relative positions of said vibrating systems with respect to each other, and means for selectively immobilizing one of said vibrating systems when said device is in one of two operating positions and for immobilizing the other of said vibrating systems when said device is in the other of its operating positions.

2. A vibration sensitive device which comprises two vibrating systems, means coupling said vibrating systems for generation of a voltage upon variations in the relative positions of said vibrating systems with respect to each other, and means including a resilient mounting for said vibrating systems for selectively immobilizing one of said vibrating systems when said device is in one of two operating positions and for immobilizing the other of said vibrating systems when said device is in the other of its operating positions.

3. A vibration sensitive device which comprises two inertia elements resiliently supported from an intermediate structure, a coupling between said inertia elements for generation of a voltage upon variations in the relative positions thereof, and means resiliently mounting said intermediate structure for movement into one position for immobilizing one of said inertia elements when said device is in one of two operating positions and for movement to a second position for immobilizing the other of said inertia elements when said device is in the other of its operating positions.

4. A vibration sensitive device which comprises two vibrating systems, means coupling said vibrating systems for generation of a voltage upon variations in the relative positions of said vibrating systems, and means including a slidable mounting for said vibrating systems for movement of one of said systems to a position where it will not vibrate upon movement of said device to one operating position and upon movement of said device to a second operating position will move the other of said vibrating systems to a position where it will not vibrate.

5. A vibration sensitive device which comprises two inertia elements, resilient supports for said elements extending from an intermediate structure, a coupling between said inertia elements for generation of a voltage upon variations in the relative positions thereof, means slidably mounting said intermediate structure, and means engaging one of said inertia elements when said device is in one of two operating positions and for engaging the other of said elements when said device is in a second operating position selectively to render effective one or the other of the resilient supports for said elements.

6. A vibration sensitive device disposed within a housing which comprises a frame, two inertia elements, resilient supports extending from said frame for said elements to form two vibrating systems, means coupling said vibrating systems for generation of a voltage upon variation in the relative positions thereof, and slidable mounting means for said frame for limited movement toward one wall of said housing, means rigid with said wall for immobilizing one of said inertia elements when said frame moves in the direction thereof, and means rigid with the opposite wall of the housing engaging the other inertia element upon movement of said frame in its direction.

7. A vibration sensitive device for generating a voltage whose polarity, for a given direction of ground motion, is the same in either of two operating positions of said device which comprises a support, two inertia elements resiliently mounted upon said support forming two vibrating systems magnetically coupled together, means associated with said magnetically coupled systems for generating a voltage proportional to the rate of change of said magnetic coupling between said inertia elements, and means for selectively immobilizing one of said inertia elements when said device is in one of two operating positions and for immobilizing the other of said inertia elements when said device is in the other of its operating positions.

8. A vibration sensitive device for generating a voltage whose polarity, for a given direction of ground motion, is the same in either of two operating positions of said device which comprises a support, two magnetic structures resiliently mounted from said support, said magnetic structures being spaced one from the other and forming a magnetic flux path, electrical conductors linking said flux path for generation of a voltage proportional to the rate of change of the spacing between said magnetic structures, and means mounting said support gravitationally to position one of said magnetic structures in fixed relation with respect to said support while allowing the other magnetic structure freely to vibrate thereby to generate a voltage whose polarity is independent of which magnetic structure is in said fixed relation.

9. A vibration sensitive device for generating a voltage whose polarity, for a given direction of ground motion, is the same in either of two operating positions which comprises a housing, an intermediate support, two permanent magnets, means including springs mounting one of said magnets from one end of said support and the other magnet from the opposite end of said support with their pole faces in oppositely poled spaced relationship and forming two vibrating systems having the same resonant frequency, a coil linking the flux path formed by said oppositely poled magnets for generation of a voltage proportional to the rate of change of the spacing between said magnets, and means movably mounting said support within said housing gravitationally to position said support and one of said vibrating systems in fixed relation to said housing with said device in the first of its two operating positions and gravitationally to position said support and the other of said vibrating systems in fixed relation to said housing with the device in its other operating position.

10. A vibration sensitive device for generating a voltage the polarity of which for a given direction of ground motion is the same in either of two operating positions which comprises a support, two inertia elements resiliently mounted upon said support forming two vibrating systems, means electromagnetically coupling said vibrating systems for generation of a voltage proportional to the rate of change of the relative positions thereof, and means for immobilizing one of said inertia elements when said device is in the first of said operating positions and for immobilizing the other of said inertia elements when said device is in the second of its said operating positions.

11. A vibration sensitive device for generating a voltage the polarity of which for a given direction of ground motion is the same in either of two operating positions which comprises a support, two inertia elements resiliently mounted upon said support forming two vibrating systems, one of said inertia elements including a magnetic circuit having an air gap, the other inertia element including a coil, said inertia elements mounted with said coil in said air gap for generating a voltage proportional to the velocity and direction of movement of said coil in said air gap upon vibration of said inertia elements, and means mounting said support gravitationally to position one of said inertia elements in fixed relation to said support when said device is in the first of said operating positions and for positioning the other of said inertia elements in fixed relation to said support when said device is in the second of said operating positions.

12. A vibration sensitive device for generating a voltage the polarity of which for a given direction of ground motion is the same in either of two operating positions which comprises a housing, a support, two inertia elements, springs mounting one of said inertia elements from each end of said support, said inertia elements being in coaxial relationship, one of said inertia elements including a cylindrical permanent magnet, a pole piece concentrically positioned adjacent one end of said magnet and spaced radially therefrom and forming an air gap, means completing a magnetic path between the other end of said magnet and said pole piece, said second inertia element including a mass and a coil, said coil positioned in said air gap and encircling said magnet for generation of a voltage therein upon variation in the relative positions of said inertia elements, and means movably mounting said support within said housing gravitationally to position said support and one of said inertia elements in fixed relation with said housing when said device is in the first of said operating positions and for positioning the other of said inertia elements in fixed relation with said housing when said device is in the second of said operating positions.

13. A vibration sensitive device for generating a voltage whose polarity for a given direction of ground motion is the same in either of two operating positions which comprises a support, two inertia elements resiliently mounted on said support forming two vibrating systems, means mechanically coupling said vibrating systems for generation of a voltage proportional to the amplitude of relative movement therebetween, and means mounting said support for immobilizing one of said vibrating systems when said device is in the first of said operating positions and for immobilizing the other of said vibrating systems when said device is in the second of said operating positions.

14. A vibration sensitive device for generating a voltage whose polarity for a given direction of ground motion is the same in either of two operating positions which comprises a support, two inertia elements, springs mounting one of said inertia elements from each end of said support and in spaced relation one to the other forming two vibrating systems, means including a piezoelectric generator coupling said vibrating systems for producing a voltage upon variation in the spaced relationship between said elements, and means mounting said support gravitationally to position one of said elements in fixed relation with respect to said support while allowing the other element freely to vibrate thereby to generate a voltage whose polarity is independent of which of said elements is in said fixed relation.

15. A vibration sensitive device for generating a voltage whose polarity for a given direction of ground motion is the same in either of two operating positions which comprises a housing, a support within said housing, two inertia elements, bifurcated springs mounting one of said inertia elements from each end of said support, said bifurcated springs having intermediate portions thereof forming curved tongued extensions, a piezoelectric crystal mounted between the extremities of said tongues, circuit-forming means contacting said crystal for detecting voltages generated upon changes in the pressure exerted due to changes in the relative positions of said vibrating systems, and a mounting for said support for positioning one of said inertia elements and said support in fixed relation with said housing when said device is in the first of two operating positions and for positioning said support and the other of said inertia elements in fixed relation with said housing when said device is in the second of said operating positions.

16. A vibration sensitive device for generating a voltage whose polarity for a given direction of ground motion is the same in either of two operating positions which comprises a housing, a support within said housing, two inertia elements, bifurcated springs mounting one of said inertia elements from each end of said support, said bifurcated springs having intermediate portions thereof forming curved tongued extensions, an elongated piezoelectric crystal slab fastened to and electrically insulated from said support extending between and obliquely of the extremities of said tongues, circuit-forming means for detecting voltages generated by said crystal upon deformation of said crystal from its normal planar configuration due to pressure exerted by said tongues upon vibration of said inertia elements, and a mounting for said support for positioning one of said inertia elements and said support in fixed relation with said housing when said device is in one of two operating positions and for positioning the other of said inertia elements and said support in fixed relation with said housing when said device is in the other of said two operating positions.

17. The combination with a flexible cable, of a series of geophones housed at spaced intervals within said cable and whose relative orientations may differ for different spread locations, said cable having such cross-sectional shape that each geophone will assume one or the other of two positions and each of said geophones comprising two vibrating systems, means to immobilize one of said systems when in the other of said positions and for immobilizing the other of said systems when in the other of said positions, and a common coupling between said systems to produce a voltage whose phase is independent of which vibrating system is immobilized, the aforementioned shape of the cable and the construction of the geophones insuring constant phase relation of the outputs of the series of geophones independent of their orientation.

18. A seismic cable which comprises a plurality of vibration sensitive devices spaced one from another at predetermined intervals, electrical conductors connecting each of said devices, a sheath enclosing said devices and conductors forming a unitary system, each of said devices having two vibrating systems, means for generating a voltage proportional to changes in the spaced relation between said systems, and means for immobilizing one of said systems when in the first of two operating positions and for immobilizing the other of said systems when in the second of said two operating positions, said cable having one cross-sectional dimension elongated at each geophone location forming flat faces perpendicular to the direction of movement of said vibrating systems automatically to orient each geophone in one of said two positions when placed on the earth.

19. The combination of a flexible cable characterized by having one transverse dimension elongated at least at spaced sections along the length thereof, a vibration sensitive device housed in each of said sections and comprising two vibratory elements with means for coupling said vibratory elements for voltage generation upon variation in the relative position of said elements, and means for mounting said vibration sensitive device in said cable gravitationally to position one of said elements of each of said devices in fixed relation with respect to said cable while allowing the other element of each of said devices freely to vibrate for generation of voltages having the same polarity for the same direction of movement of the vibratory elements independent of which of said elements of said device is in said fixed relation.

KENNETH W. McLOAD.

REFERENCES CITED

The following references are of record in the file of this patent:

UNITED STATES PATENTS

| Number | Name | Date |
| --- | --- | --- |
| 2,272,984 | Ritzmann | Feb. 10, 1942 |
| 2,307,792 | Hoover | Jan. 12, 1943 |
| 2,372,056 | Broding | Mar. 20, 1945 |
| 2,423,970 | Gardner | July 15, 1947 |